United States Patent
Delavalle et al.

(10) Patent No.: US 6,659,525 B2
(45) Date of Patent: Dec. 9, 2003

(54) MOTOR VEHICLE STORAGE MODULE CLOSED AT THE REAR BY A FACADE FORMING AN ELEMENT OF BODYWORK

(75) Inventors: Dominique Delavalle, Marchon (FR); Cyrille Rochon, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/809,276

(22) Filed: Mar. 16, 2001

(65) Prior Publication Data

US 2001/0022450 A1 Sep. 20, 2001

(30) Foreign Application Priority Data

Mar. 20, 2000 (FR) .............................. 00 03529

(51) Int. Cl.[7] .................. B62D 43/04; B62D 33/08; B60R 11/06
(52) U.S. Cl. ................ 296/37.2; 296/26.08; 296/26.09; 296/26.1
(58) Field of Search ............... 296/37.2, 37.1, 296/26.08, 26.09, 26.1

(56) References Cited

U.S. PATENT DOCUMENTS

| | | | |
|---|---|---|---|
| 2,080,989 A | * | 5/1937 | Smith |
| 2,841,232 A | * | 7/1958 | Loeffler |
| 4,072,258 A | | 2/1978 | Cruson |
| 4,228,936 A | | 10/1980 | Rife |
| 4,676,415 A | | 6/1987 | Kennedy |
| 4,795,302 A | | 1/1989 | Dalton |
| 4,896,910 A | * | 1/1990 | Carter ..................... 293/117 |
| 4,958,870 A | * | 9/1990 | Carter ..................... 293/106 |
| 6,328,366 B1 | * | 12/2001 | Foster et al. ............ 296/37.6 |

FOREIGN PATENT DOCUMENTS

| | | |
|---|---|---|
| DE | 77 14 592 U | 9/1977 |
| DE | 43 23 621 C | 9/1994 |
| DE | 296 15 888 U | 11/1996 |
| EP | 0 477 095 A | 3/1992 |
| EP | 0 816 209 A | 1/1998 |
| JP | 61-092967 | 5/1986 |

* cited by examiner

Primary Examiner—Stephen T. Gordon
Assistant Examiner—Paul Chenevert
(74) Attorney, Agent, or Firm—Oliff & Berridge, PLC

(57) ABSTRACT

A motor vehicle storage module that is movable between an extended position and a retracted position, situated beneath the vehicle. The module has as at least one compartment enabling articles other than a spare wheel to be stored, is accessible from outside the vehicle, and it is closed at the rear by a rear facade arranged to constitute an element of bodywork when the module is in the retracted position.

36 Claims, 3 Drawing Sheets

MOTOR VEHICLE STORAGE MODULE CLOSED AT THE REAR BY A FACADE FORMING AN ELEMENT OF BODYWORK

The present invention relates to motor vehicles.

BACKGROUND OF THE INVENTION

Vehicles are known in which the spare wheel is received in a sliding support situated at the rear of the vehicle, beneath the trunk. The support allows the spare wheel to project rearwards and enables it to act as an impact absorber. Signaling elements and the number or license plate are fixed to the vehicle above the sliding support.

Utility model DE 77 14592 discloses a retractable trunk extender. Such an extender does not enable additional storage volume to be provided without changing the appearance of the vehicle, and that is not desirable.

U.S. Pat. No. 4,676,415 describes a spare wheel storage drawer which can be retracted through an opening in the bumper. The drawer has an effect on the operation of the impact absorbing system, which makes it necessary to provide a specific impact absorbing system.

In general terms, there exists a need to improve the appearance and the storage capacity of motor vehicles.

There also exists a need to facilitate integrating signaling elements such as rear lights, reversing lights, or tog lights with the bodywork, or integrating detector elements such as a reversing radar.

There also exists a need to facilitate and limit the cost of replacing those vehicle elements that are likely to be damaged in the event of a rear impact.

OBJECT AND SUMMARY OF THE INVENTION

The object of the present invention is to resolve the above needs in full or in part.

The invention achieves this by providing a rear storage module for a motor vehicle, the module:

being movable between an extended position and a retracted position;

being situated beneath the vehicle;

including at least one compartment enabling articles other than a spare wheel to be stored;

being accessible from outside the vehicle; and being closed at the rear by a rear facade arranged to constitute an element of bodywork when the module is in the retracted position.

By means of the invention, the appearance of the vehicle can be improved compared with the above-described known vehicles since the storage module makes it possible to house a spare wheel (whether full-sized or a space-saver) without the wheel being visible.

In addition, the presence of the rear facade makes it possible to use the storage module for storing objects other than a spare wheel, for example accessories such an chains, a roof bar, a bicycle rack, etc.

Advantageously, the rear module does not contribute to the structural strength of the vehicle and has no effect on the operation of the vehicle impact absorber system.

The rear facade is also advantageously used to support signaling and/or detector devices.

These devices can be integrated relatively easily in the rear facade since it is easily handled in the factory because of its relatively small size.

In comparison, such signaling and/or detector elements can be more difficult to integrate in an integrally-formed rear block that is considerably bulkier than the rear facade.

Finally, the presence of the rear facade makes it possible to improve air flow while the vehicle is moving and thus to reduce aerodynamic drag.

In a particular embodiment, for a vehicle including a shield underneath, the storage module is secured to support elements enabling it to be mounted on the vehicle, said support means being arranged to enable the module to be moved between an extended position in which it projects rearwards or opens ajar beneath the shield to provide the user with access to a storage volume, and a retracted position in which the rear facade of the module forms an element of the bodywork of the vehicle.

Still in a particular embodiment, the vehicle includes at least one impact absorber at the rear, and the support means are arranged to enable the storage module to pass beneath the absorber while the module is being moved between its extended position and its retracted position.

In this embodiment, the support means are preferably arranged to enable the storage module to pass beneath the impact absorber(s) in a movement that is different from a pure translation movement so as to have a relatively large storage volume at the front of the module and so as to make it possible, in spite of said configuration, to move the module by going downwardly round the impact absorber(s).

Thus, by means of such a path, this particular embodiment makes it possible to take advantage of the space available beneath the vehicle in front of its rear impact absorbers.

Advantageously, the storage module is compartmentalized and defines at least two storage volumes, e.g. a front compartment housing a spare wheel and a rear compartment used for storing other accessories or articles.

Advantageously, the rear facade of the storage module is fastened to the remainder of the module by fastening means that are easily disassembled.

The term "fastening means that are easily disassembled" is used to cover fastening means that enable the rear facade of the module to be replaced easily in the event of it being damaged by an impact.

By way of example, such fastening means can be constituted by fastening means involving screwing or snap-fastening.

In some cases, easy replacement of the rear facade of the storage module makes it possible to reduce repair costs.

The fastening and/or support elements of the storage module can include fusible links.

The term "fusible links" is used to mean links which break or disintegrate in the event of a small impact so as to enable the storage module and/or the support elements to separate from the vehicle and thus reduce the risk of damage to the module and/or the vehicle bodywork.

In a particular embodiment, the storage module is mounted so as to be capable of pivoting about hinge axes.

The hinge axes can be stationary relative to the remainder of the vehicle.

In a particular embodiment, the storage module includes at least two elements that are hinged relative to each other.

The storage module can thus comprise a front element and a rear element hinged relative to the front element, the front element having a housing capable of receiving a spare wheel in particular, and the rear element including a storage bin.

The front element is preferably arranged to cooperate with locking means carried by the vehicle so as to enable it to be held in a road position without preventing the rear element from tilting.

Thus, the rear element can be used to store accessories or articles while the front element is used for storing the spare wheel, with the front element being tilted only when necessary to gain access to the spare wheel.

The rear element advantageously includes a locking system arranged to enable it to be held in a closed position.

The storage module can have hinge portions each presenting a housing for receiving the end of a hinge pin secured to the vehicle, said housing being rearwardly open so as to enable the storage module to be released in the event of a rear impact.

The invention also provides a motor vehicle fitted with a storage module as specified above.

The invention thus provides a motor vehicle including, at the rear, firstly a storage module situated beneath the vehicle and closed at the rear by a rear facade, and secondly support elements for said module arranged to enable the module to be moved at least in part between an open position in which it provides a user with access to a storage volume enabling articles other than a spare wheel to be stored, and a retracted position in which the rear facade of the module forms a bodywork element.

BRIEF DESCRIPTION OF THE DRAWINGS

The invention will be better understood on reading the following detailed description of non-limiting embodiments, and on examining the accompanying drawings, in which.

MORE DETAILED DESCRIPTION

Figure 1:
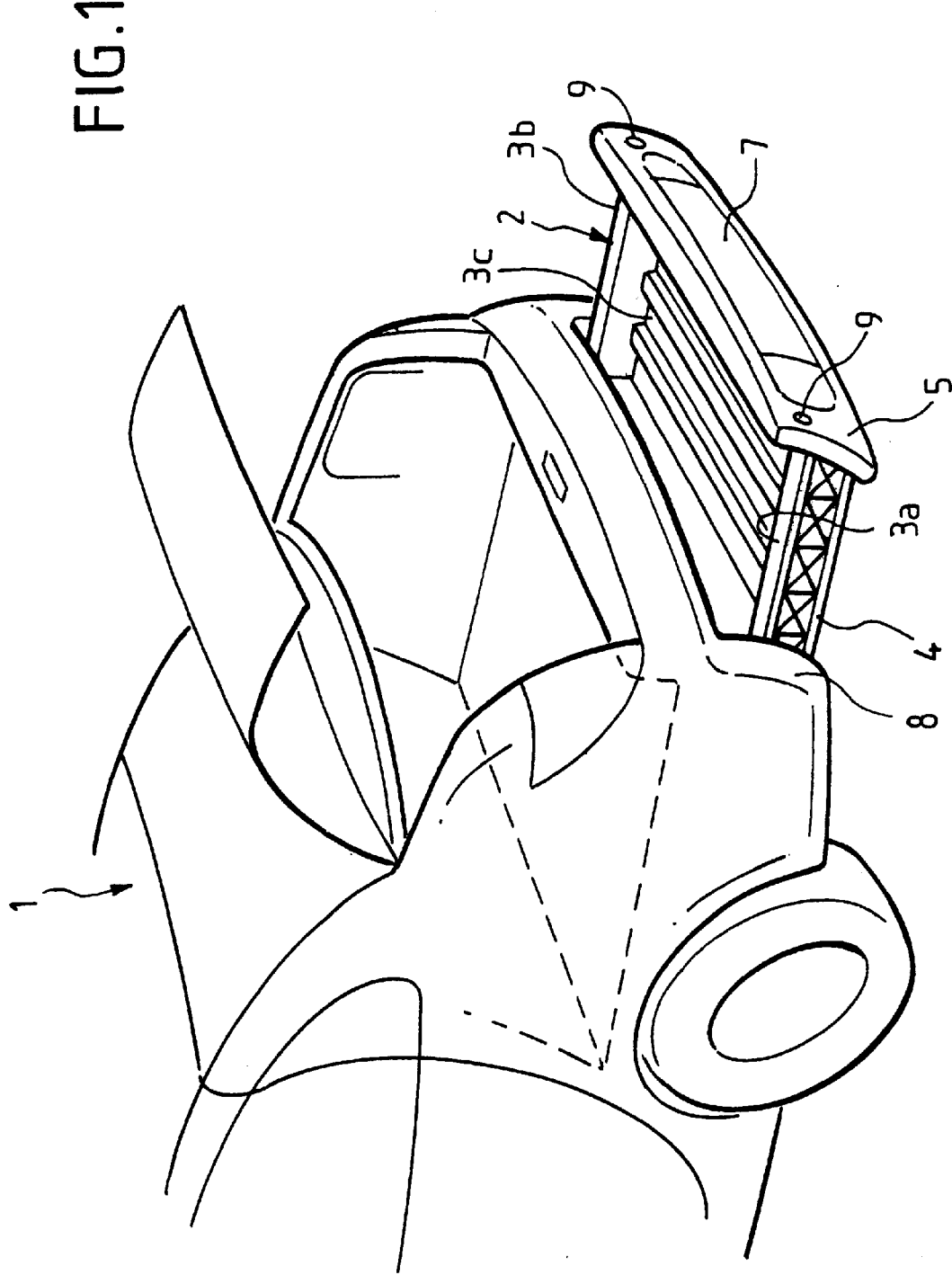
FIG. 1 is a diagrammatic perspective view of a vehicle fitted with a storage module constituting a first embodiment.

FIG. 1 shows a vehicle 1 fitted at the rear with a storage module or drawer 2 constituting a first embodiment of the invention.

In this embodiment, the module 2 is mounted to slide relative to the vehicle in the longitudinal direction of the vehicle, and it includes two side walls 3a and 3b and a horizontal bottom wall 3c interconnecting the side walls 3a and 3b.

The side walls are provided with section members 4 on their outsides, said section members 4 being engaged in slideways of the vehicle (not shown).

The module 2 also includes a rear facade 5 which constitutes an element of bodywork and which serves, in the embodiment described, as a support for the number or license plate 7.

The module 2 can slide between a retracted position in which the rear facade 5 lies flush with the outside face of the rear bumper 8, and an extended position in which the module 2 is cantilevered out behind the trunk of the vehicle and enables accessories to be placed therein.

In the embodiment described, the facade 5 is releasably fastened to the side walls 3a and 3b and also to the bottom wall 3c, thereby firstly making it easier to replace in the event of a rear impact, and secondly making it easy to install facades of different styles depending on vehicle version.

Such releasable fastening means can be constituted by snap-fastening means or by bolt means, for example.

FIG. 1 shows, in diagrammatic manner, reversing sensors 9 integrated in the rear facade 5 when it is manufactured, thereby making them easier to install on the vehicle.

Figure 2:
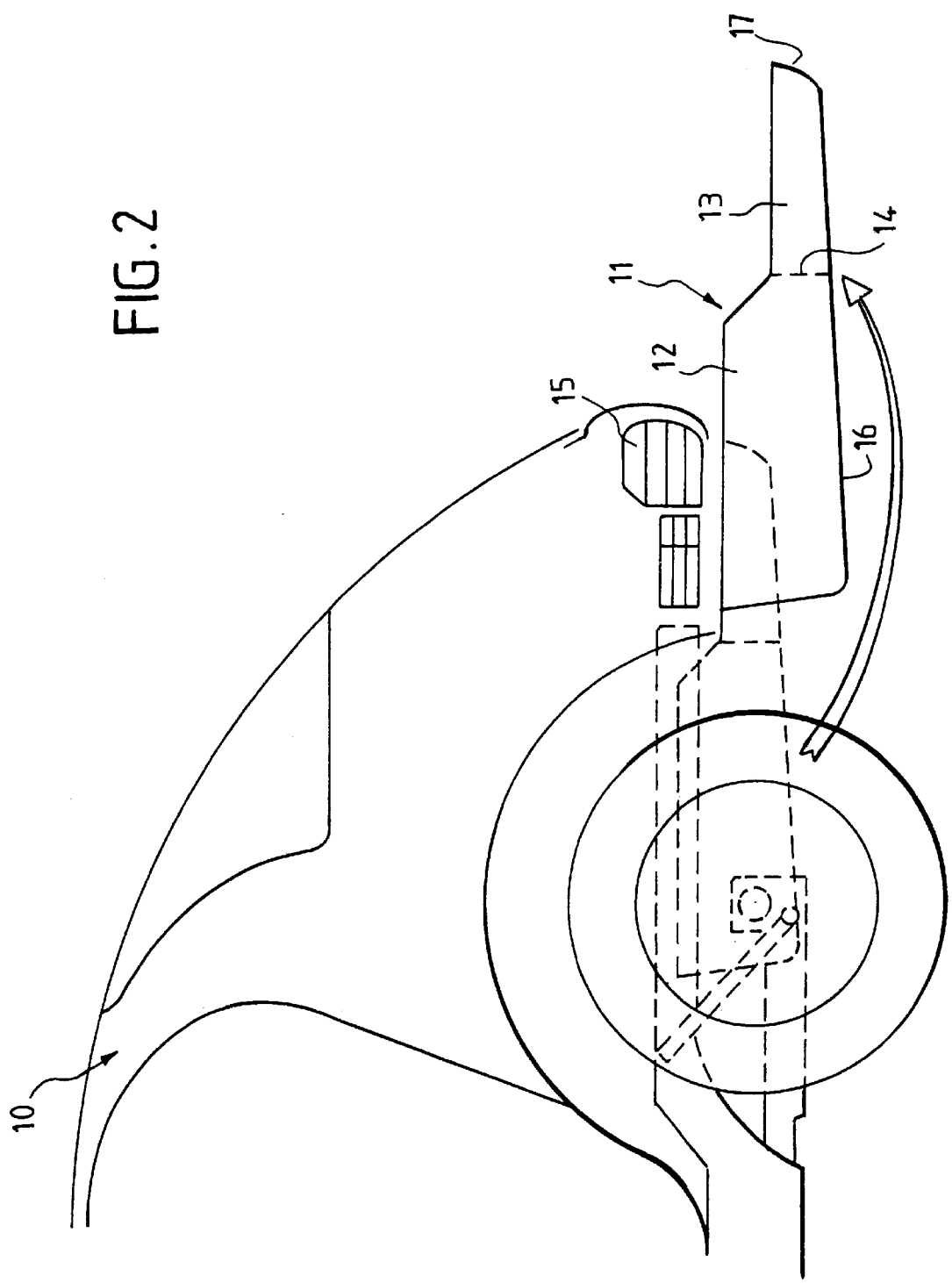
FIG. 2 is a diagrammatic side view of a vehicle fitted with a storage module constituting a second embodiment.

FIG. 2 shows a vehicle 10 including a rear storage module or drawer 11 which is shown in highly diagrammatic manner in the drawing.

This rear module 11 is held by support means which are not shown in order to clarify the drawing, and which enable it to move between a retracted position shown in dashed lines in FIG. 2, and an extended position shown in continuous lines in the figure.

The rear module 11 has a front compartment 12 and a rear compartment 13 that are separated by a partition 14.

In this embodiment, the front compartment 12 is used to house a spare wheel, while the rear compartment 13 is used to store accessories or articles.

In this case, the depth of the front compartment 12 is greater than that of the rear compartment 13.

In the retracted position, the rear compartment 13 is situated beneath an impact absorber 15 of the vehicle, as can be seen in FIG. 2.

The above-mentioned support means are arranged in such a manner as to enable the rear module 11 to be taken from its retracted position to its extended position by a movement that is not a pure translation movement, but in a movement that is more complex so as to enable it to pass beneath the impact absorber 15.

The module 11 has no incidence on the operation of the impact absorber 15.

By way of example, the support means can include parallelogram linkages enabling such movement to be obtained.

It will be observed that the rear module 11 in the retracted position improves the aerodynamics of the vehicle by creating a ground effect with its bottom wall 16.

In this embodiment, the rear module 11 is set slightly forward of the impact absorber 15 so that the impact absorber is engaged first in the event of a rear impact, thereby tending to reduce the amount of damage to the rear module 11.

The support means advantageously include fusible links which enable the rear module 11 to separate from the vehicle in the event of a violent rear impact.

In the embodiment of FIG. 2, the rear module 11 is closed at the rear by a rear facade 17 that finishes off the bottom portion of the vehicle bumper.

Figure 3:
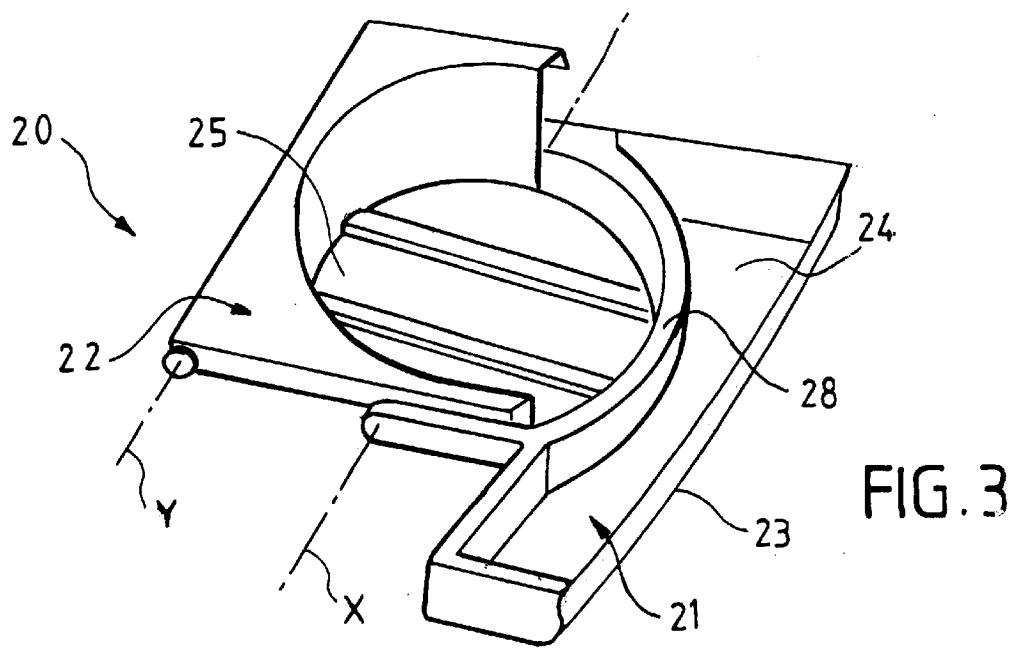
FIG. 3 is a diagrammatic perspective view of a storage module constituting a third embodiment.
Figure 4:
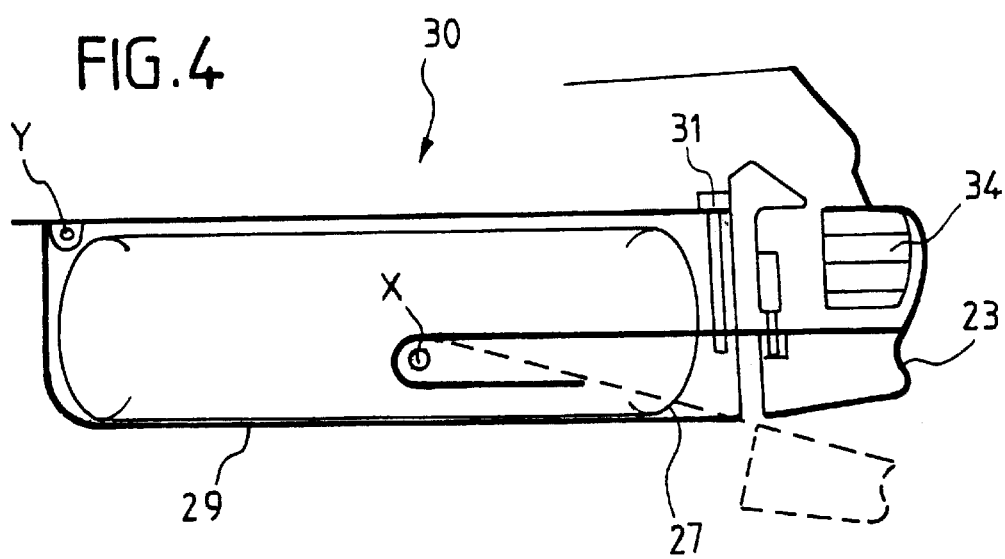
FIG. 4 is a diagrammatic and fragmentary side view of a vehicle fitted with the FIG. 3 storage module, showing there the hinge pins are located.
Figure 5:
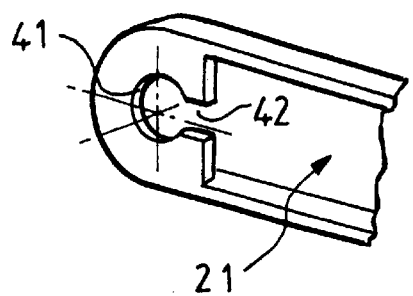
FIG. 5 is a diagrammatic perspective view showing, on its own, a hinge piece of the FIG. 3 storage module.

FIGS. 3 to 5 show a rear storage module or drawer 20 comprising a rear element 21 and a front element 22.

In this example, these two elements 21 and 22 are made essentially of reinforced thermoplastic material.

The rear element 21 has a rear facade 23 which constitutes a bottom portion of the bodywork of a vehicle 30, with only a rear portion thereof being visible in FIG. 4.

As can be seen in FIG. 3, the rear element 21 forms a bin 24 that can be used for storing accessories or articles.

The front element 22 forms a housing 25 that is to receive a spare wheel 27, which is shown in part and highly diagrammatically in FIG. 4.

The rear element 21 has a wall 28 which closes the rear of the housing 25 when the rear drawer 20 is in its road configuration.

In the embodiment described, the rear element 21 can pivot relative to the front element 22 about a pivot axis X extending perpendicularly to the longitudinal axis of the vehicle and passing substantially through the center of the housing 25.

The front element 22 can pivot relative to the vehicle about an axis Y that is parallel to the axis X.

The front element 22 is held in its road position where the bottom wall 29 of the housing 25 is kept substantially horizontal by a hook system 31 which is shown very diagrammatically in FIG. 4.

This hook system can be actuated from the bottom of the vehicle trunk in order to release the front element 22.

By way of example, it can be constituted by a handle including a hook that is capable of engaging a rim of the front element 22 so as to hold it in its road position.

Turning the above-mentioned handle serves to release the rim in question and enables the front element 22 to tilt downwards.

Because the front element 22 is held in the road position by the hook system 31, the rear element 21 can be tilted independently of the front element 22 to access the storage bin 24.

Locking means are provided to hold the rear element 21 in the road position so long as there is no need to access the storage bin 24.

By way of example, these locking means can be constituted by a lock secured to the rear element 21 and controllable by means of the centralized locking system of the vehicle.

It will be observed in FIG. 4 that the rear element 21 when in the road position is situated beneath an impact absorber 34 of the vehicle without projecting rearwards to a significant extent, such that in the event of a rear impact it is the impact absorber 34 that is engaged first.

Advantageously, as in the embodiment described, the rear element 21 is hinged at its front end to the front element 22 by means of hinge portions of the kind shown in isolation in FIG. 5, each comprising a housing 41 for receiving the end of a hinge pin secured to the front element 22.

The housing 41 includes a passage 42 extending rewards so as to enable the rear element 21 to disengage from the hinge pins of the front element in the event of it being moved forwards under the effect of a rear impact.

In general, in all of the embodiments, the rear facade of the storage module is advantageously removable and serves as a support for lighting devices and/or for various sensors or detectors.

Naturally, the invention is not limited to the embodiments described above.

What is claimed is:

1. In a motor vehicle comprising a bodywork and an impact absorber system with a shield, a rear storage module situated beneath the vehicle and movable between an open position and a closed position; said module:
   including at least one compartment enabling articles other than a spare wheel to be stored;
   being accessible from outside the vehicle;
   being closed at the rear by a rear facade configured to constitute an element of bodywork when the module is in the closed position, said rear facade lying flush with an outside face of the shield, when said module is in the closed position; and
   being made of reinforced thermoplastic material.

2. A module according to claim 1, being separate from the impact absorber system.

3. A module according to claim 1, wherein the rear facade supports at least one of signaling and detector devices.

4. A module according to claim 1, wherein the rear facade is fastened to the remainder of the module by links that are easily disassembled.

5. A module according to claim 1, slidably mounted on the vehicle.

6. A module according to claim 1, the impact absorber system comprising the shield, the module being secured to support elements enabling it to be mounted on the vehicle, said support elements being arranged to enable the module to be moved between an open position in which it projects rearwards or opens ajar beneath the shield to provide the user with access to a storage volume, and a closed position in which the rear facade of the module forms an element of the bodywork of the vehicle.

7. A module according to claim 6, wherein said support elements are arranged to enable the module to be moved in a movement that is not a pure translation movement, so as to enable the module to be moved downwardly around one or more impact absorbers.

8. A module according to claim 1, comprising at least two storage compartments.

9. A module according to claim 4, wherein one of said compartment is configured to house a spare wheel.

10. A module according to claim 1, the module being mounted so as to be capable of pivoting about hinge pins.

11. A module according to claim 10, wherein the hinge pins are fixed relative to the vehicle.

12. A module according to claim 10, comprising two hinged-together elements.

13. A module according to claim 12, comprising a front element and a rear element hinged relative to the front element, the front element including a housing capable of receiving a spare wheel, and the rear element including a storage bin.

14. A module according to claim 13, wherein the rear element includes hinge portions each presenting a housing for receiving the end of a hinge pin secured to the front element, each of said housings being rearwardly open so as to enable the rear element to be released in the event of a rear impact.

15. A module according to claim 13, wherein the front element is arranged to co-operate with a locking system carried by the vehicle and suitable for maintaining the front element in a road position without preventing the rear element from tilting.

16. A module according to claim 15, wherein the rear element has a locking system arranged to enable it to be maintained in the closed position.

17. In a motor vehicle comprising a bodywork and an impact absorber system with a shield, a rear storage module situated beneath the vehicle and movable between an open position and a closed position; said module:
   being accessible from outside the vehicle;
   being closed at the rear by a rear facade configured to constitute an element of bodywork when the module is in the closed position;
   being separate from the impact absorber system;
   comprising a front element and a rear element hinged relative to the front element, the front element including a housing capable of receiving a spare wheel, and the rear element including a storage bin enabling articles other than a spare wheel to be stored; and
   the front element being hinged relative to the vehicle and arranged to co-operate with a locking system carried by the vehicle and suitable for maintaining the front element in a road position without preventing the rear element from tilting.

18. In a motor vehicle comprising a bodywork, a trunk and an impact absorber system with a shield, a rear storage module including at least one compartment enabling articles other than a spare wheel to be stored; said module being:

moveable between an open position and a closed position;

situated beneath the trunk and the impact absorber system;

accessible from outside the vehicle;

closed at the rear by a rear facade arranged to constitute an element of bodywork when the module is in the closed position and said rear facade lies flush with an outside face of the shield; and secured to support elements enabling it to be mounted on the vehicle, said support elements being arranged to enable the module to be moved between the open position in which it projects rearwards or opens ajar beneath the shield to provide a user with access to a storage volume, and the closed position in which the rear facade of the module forms an element of the bodywork of the vehicle.

19. A module according to claim 18, the module being mounted so as to be capable of pivoting about hinge pins.

20. A module according to claim 18, wherein the rear facade is fastened to the remainder of the module by links that are easily disassembled.

21. A module according to claim 18, comprising at least two storage compartments.

22. A module according to claim 21, wherein one of said compartment is configured to house a spare wheel.

23. In a motor vehicle comprising a bodywork and an impact absorber system with a shield, a rear storage module, said module being:

movable between an open position and a closed position;

situated beneath the vehicle;

accessible from outside the vehicle; and closed at the rear by a rear facade arranged to constitute an element of bodywork when the module is in the closed position and said rear facade lies flush with an outside face of the shield, said module further comprising:
a front element hinged relative to the vehicle and including a housing capable of receiving a spare wheel; and
a rear element hinged relative to the front element and including a storage bin enabling articles other than a spare wheel to be stored.

24. A module according to claim 23, wherein the rear element includes hinge portions each presenting a housing for receiving the end of a hinge pin secured to the front element, each of said housings being rearwardly open so as to enable the rear element to be released in the event of a rear impact.

25. A module according to claim 23, wherein the front element is arranged to co-operate with a locking system carried by the vehicle and suitable for maintaining the front element in a road position without preventing the rear element from tilting.

26. A module according to claim 25, wherein the rear element has a locking system arranged to enable it to be maintained in a closed position.

27. In a motor vehicle comprising a bodywork, a trunk and an impact absorber system with a shield, a rear storage module being:

movable between an open position and a closed position;

situated beneath the trunk and the impact absorber system;

accessible from outside the vehicle;

closed at the rear by a rear facade arranged to constitute an element of bodywork when the module is in the closed position and said rear facade lies flush with an outside face of the shield; and secured to the vehicle via fusible elements.

28. A module according to claim 27, being configured so that the module has substantially no effect on the operation of the impact absorber system.

29. A module according to claim 27, the vehicle comprising the shield, the module being secured to support elements enabling it to be mounted on the vehicle, said support elements being arranged to enable the module to be moved between the open position in which it projects rearwards or opens ajar beneath the shield to provide the user with access to a storage volume, and the closed position in which the rear facade of the module forms an element of the bodywork of the vehicle.

30. A module according to claim 27, the module being mounted so as to be capable of pivoting about hinge pins.

31. A module according to claim 27, wherein the rear facade is fastened to the remainder of the module by links that are easily disassembled.

32. A module according to claim 27, including at least one compartment enabling articles other than a spare wheel to be stored.

33. A module according to claim 27, comprising at least two storage compartments.

34. A module according to claim 33, wherein one of said compartments is configured to house a spare wheel. compartment enabling articles other than a spare wheel to be stored 35. In a motor vehicle comprising a bodywork and an impact absorber system, a rear storage module situated beneath the vehicle and movable between an open position and a closed position; said module:

being accessible from outside the vehicle;

being closed at the rear by a rear facade; and comprising a front element and a rear element hinged relative to the front element, the front element including a housing capable of receiving a spare wheel, and the rear element including a storage bin, wherein the rear element includes hinge portions each presenting a housing for receiving the end of a hinge pin secured to the front element, each of said housings being rearwardly open so as to enable the rear element to be released in the event of a rear impact.

36. A module according to claim 35, wherein the rear facade is configured to constitute an element of bodywork when the module is in the closed position.

* * * * *